United States Patent [19]

Lodder et al.

[11] 4,362,323
[45] Dec. 7, 1982

[54] PIPE PART WITH A SOCKET END

[75] Inventors: Bernhard Lodder, Hardennerg; Jan P. van Dongeren, Bergentheim; Gerard A. E. Blok, Gramsbergen, all of Netherlands

[73] Assignee: Wabin B.V., Zwolle, Netherlands

[21] Appl. No.: 237,722

[22] Filed: Feb. 24, 1981

Related U.S. Application Data

[63] Continuation of Ser. No. 18,904, Mar. 9, 1979, abandoned.

[30] Foreign Application Priority Data

Mar. 13, 1978 [NL] Netherlands .......................... 7802712
Mar. 13, 1978 [NL] Netherlands .......................... 7802713
Mar. 13, 1978 [NL] Netherlands .......................... 7806354

[51] Int. Cl.³ ............................................. F16L 55/00
[52] U.S. Cl. ......................................... 285/4; 285/23;
285/94; 285/110; 285/111; 285/231; 285/345;
285/379; 285/423
[58] Field of Search .................. 285/23, 94, 423, 379,
285/230, 231, 345, 110, 111, 3, 4, DIG. 2;
277/9.5, 181, 188, 189

[56] References Cited

U.S. PATENT DOCUMENTS 2,226,067 12/1940 Morgan .
3,462,175 8/1969 Johnson ........................... 285/94 X
3,947,944 4/1976 Washington .................... 277/9.5 X
4,022,205 5/1977 Tenczar ................................ 285/3

FOREIGN PATENT DOCUMENTS 1259156 7/1965 Fed. Rep. of Germany .
1222331 8/1966 Fed. Rep. of Germany ...... 285/111
636659 1/1928 France ................................. 285/379
7309636 7/1963 Netherlands ....................... 285/111
7802712 9/1979 Netherlands .
7511229 10/1979 Netherlands .
7312793 9/1973 Sweden .
405837 10/1963 Switzerland .
588649 4/1975 Switzerland .
826333 3/1958 United Kingdom .
1190550 5/1970 United Kingdom ................ 285/379

Primary Examiner—Dave W. Arola
Attorney, Agent, or Firm—Wilkinson, Mawhinney & Theibault

[57] ABSTRACT

Pipe with socket end provided with an annular groove chamber containing a sealing ring supported by a support ring, which support ring compresses the sealing ring less than the final inserted spigot end. The support ring closes the groove and the sealing ring or the closed space is provided with lubricant.

17 Claims, 23 Drawing Figures

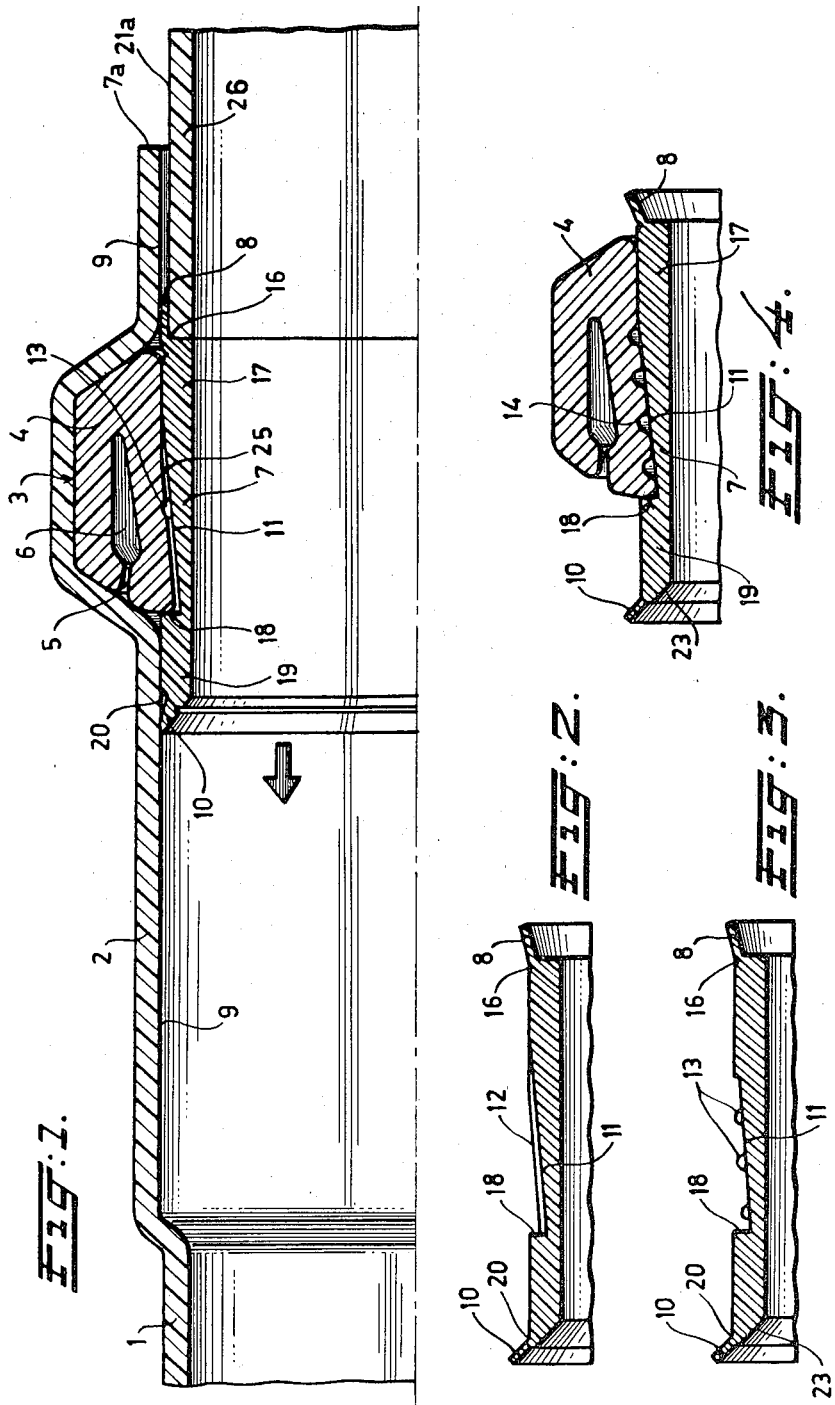

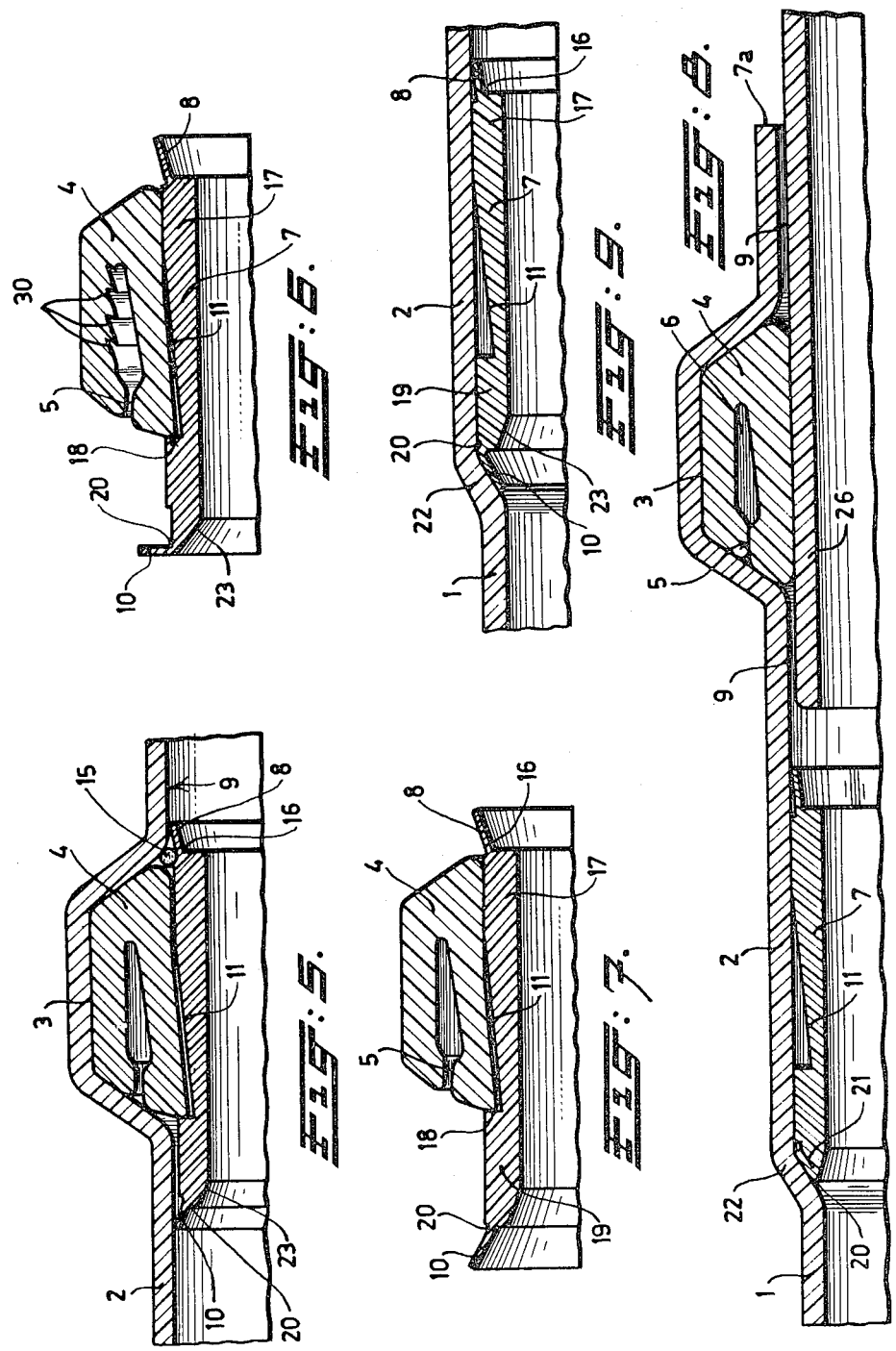

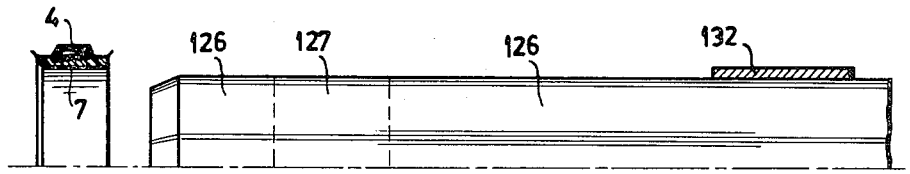
FIG:14a.
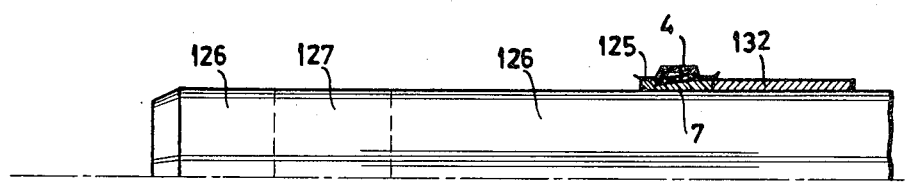
FIG:14b.
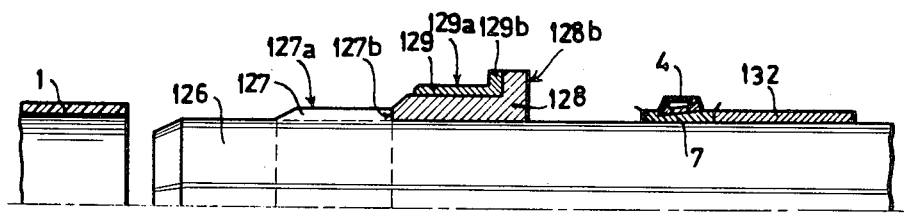
FIG:14c.
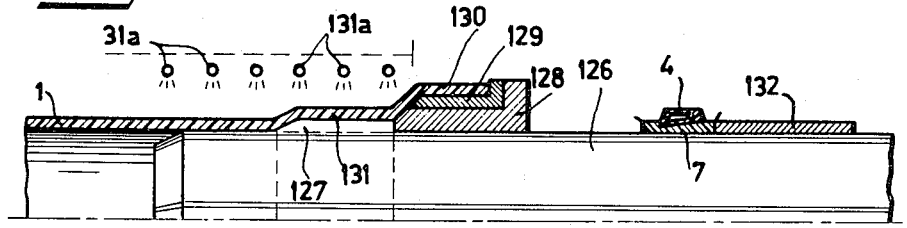
FIG:14d.
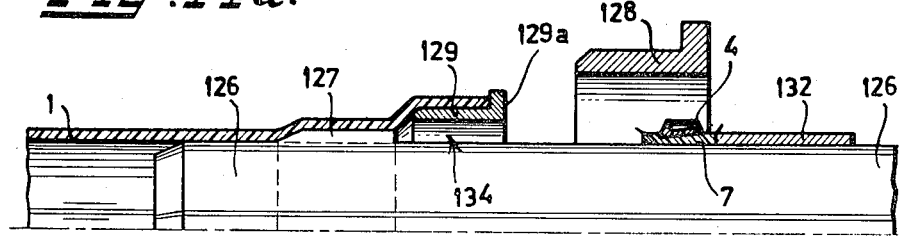
FIG:14e.

PIPE PART WITH A SOCKET END

This is a continuation of application Ser. No. 018,904, filed Mar. 9, 1979, now abandoned.

BACKGROUND OF THE INVENTION

The present invention relates to a pipe part with a socket end for receiving a male pipe part, said socket end at least being provided with an internal groove wherein an annular sealing member is disposed.

Such a pipe part is known per se. In these known pipe parts the disadvantage occurs that the annular sealing member may be disposed within the groove in a wrong manner, whereas on the other hand either during the transport of the pipe part or, for instance, by inserting a male pipe end in the socket, the annular sealing member may be inconveniently removed from the internal groove and may get damaged or cause damage.

SUMMARY OF THE INVENTION

The invention aims to obviate said disadvantages in that the annular sealing member is supported by a support ring, being removable from below the sealing member, said support ring compressing the sealing ring less than a male pipe part after its insertion.

During any transport the annular sealing member will thus be effectively supported by the support ring, which can be removed as soon as a male pipe part has to be inserted in the socket end. On the other hand the smaller compression of the sealing ring by the support ring than by the final male pipe part provides the advantage that the male pipe part can be more easily pushed into the socket end than in the case that the supporting ring compresses the sealing ring in the same way as the male pipe part.

In one embodiment the support ring is disposed slideably within the socket end, causing said support ring to be slid further into the socket end at the moment of penetration of a male pipe part, so that the sealing member is capable of completely fulfilling its sealing function.

In the abovedescribed embodiment annular sealing members to be employed, need advantageously not be provided with internal stiffening or reinforcing rings, the latter actually being a solution more expensive than the support ring as proposed in the present invention.

The annular sealing member is advantageously partially compressed by the support ring, thus facilitating the penetration of a male pipe part.

The support ring expediently seals off the internal groove.

Owing to this feature not only a support of the sealing member is obtained, but this sealing member is further protected against damage and action of dirt upon the latter during transport. It is a further advantage that an ultraviolet radiation does not influence the rubber of the annular sealing member and is thus unable to damage the latter.

In a very preferred embodiment a lubricant being already industrially applied can be received in the space bounded by the support ring, thus causing a predosed quantity of lubricant to be present at the moment of applying the rubber sealing member. The latter feature facilitates the sliding of a socket end and a male pipe part into one another in the field and further avoids unnecessary pollutions such as dust or dirt and the like, at the location of the annular sealing member.

The support ring appropriately comprises locking means, preferably a first deformable edge part upon the side directed toward the free end of the socket, in order to obtain an optimum seal whilst the support ring preferably also comprises a second deformable edge part, located upon the side directed away from the free end of the socket. It is to be preferred to have the material of the said two edge parts manufactured thinner than that of the support ring so as to obtain a good joint between the inside of the pipe part with socket end and the support ring.

The inside of the support ring opposite to the sealing member expediently comprises longitudinal and/or transverse grooves which serve for the receipt of a quantity of lubricant. Moreover the ridges forming inbetween the grooves facilitate the sliding of the support ring when the male pipe part is inserted.

The second edge part advantageously comprises one or more pivotal connections, preferably various pivotal connections so as to easily turn away the second edge part at the moment of sliding the support ring into the socket end and of the penetration of a male pipe part. The second edge part is possibly overturned so that the same comes to lie inbetween the support ring and a conically extending transition part, connecting the socket end comprising the internal groove, with the remaining portion of the pipe part.

The protection or support member may advantageously consist of an end cap disposed at each end of the pipe part and sealing off the interior of said pipe part. This feature is the simplest solution for preventing any undesired action of dirt upon the sealing member. The said end caps are rather cheap since they are being manufactured from a thinwalled plastic, whilst they can be easily removed completely later on.

Preferably the protection and support member cooperates with the inside end edge of the inner leg of the sealing member and with the wall of the groove. This is very expedient as, notwithstanding the presence of lubricant upon the leg of the sealing member, the protection member cannot be pressed toward the outside, due to the action of the flexible rubber material of the sealing member, when the latter is slightly stretched by the protection member in order to obtain an efficient protection of the lubricant.

The protection member may be provided with a weakened wall part in order to facilitate the removal of the protection member for forming a pipe joint with such a pipe part. The said weakened wall part may either consist of a thinned wall part or of very fine perforations.

In a very advantageous embodiment of the protection or support member the sealing member comprises a first end surface located closest to the free end of the socket which first end surface merges, through a conical surface, in a second end surface adjoining a circular surface situated at distance from the cone and extending toward the direction of the first end surface, said surface being provided with protruding deformable blocking means, more particularly a protruding deformable edge, cooperating with part of the wall of the groove.

The abovementioned circular surface is expediently stepped and comprises a first cylindrical part having an outer diameter which is at least equal to the smallest inner diameter of the sealing member, as well as a second cylindrical or conical part adjoining the circular surface via a radially extending transition surface, which second cylindrical or conical part cooperates with the inside of the sealing member situated at the side of the sealing member directed toward the free end of the socket.

BRIEF SURVEY OF THE DRAWINGS

FIG. 1 shows a longitudinal section through a pipe part with a socket end and an annular protection member, in accordance with the invention;

FIG. 2 shows an annular protection member with longitudinal grooves applied in a pipe part in accordance with the invention;

FIG. 3 shows a protection ring with longitudinal grooves applied in a pipe part in accordance with the invention;

FIG. 4 shows part of a sealing ring being applied in a pipe part in accordance with the invention, the said sealing ring comprising longitudinal grooves at the side which has to cooperate with a male pipe part;

FIG. 5 shows a pipe part in accordance with the invention comprising a thickened lubricant;

FIG. 6 shows a protection ring with an annular sealing member comprising a support ring;

FIG. 7 shows a protection ring with a sealing member to be applied in a pipe part in accordance with the invention;

FIG. 8 shows a longitudinal section through a pipe part with a socket end in accordance with the invention, including a male pipe part in its final position;

FIG. 9 shows a detail of a pipe part in accordance with the invention, the protection ring being in its final position after a male pipe part has penetrated;

FIGS. 14a to 14j show a very advantageous embodiment of a method in accordance with the invention for applying an annular sealing member in an annular groove of a socket end, while using a support ring.

DESCRIPTION OF PREFERRED EMBODIMENTS

Figure 10:
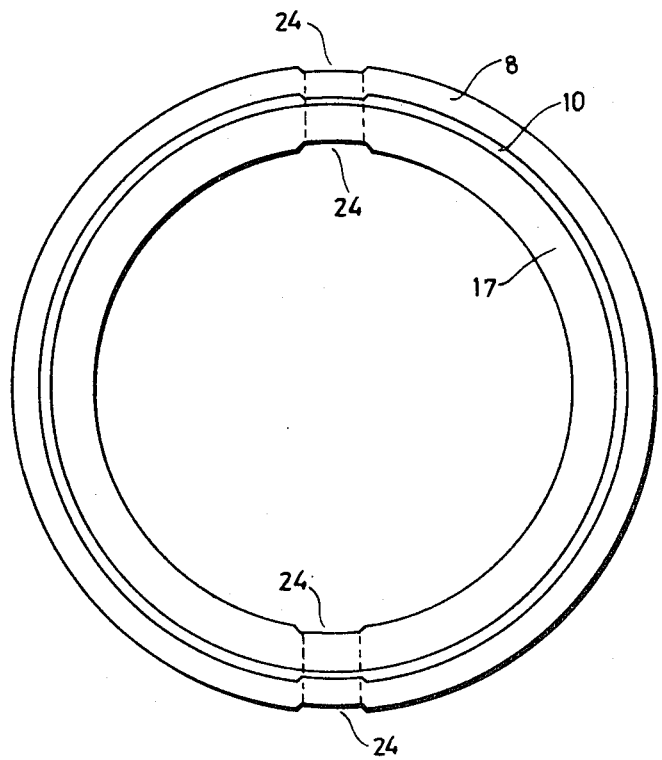
FIG. 10 shows a view of a protection ring comprising a weakened wall part.

FIG. 1 shows a plastic pipe part 1 comprising a widened socket end 2, in which socket end 2 an annular groove 3 is formed by deforming the plastic pipe.

The annular groove 3 comprises an annular sealing member 4, having a U- or V-shaped cross section, the open end 5 of which being directed away from the free end 7a of the socket 2.

In between the two legs of the annular sealing member there is expediently a space 6, capable of absorbing any differences in tolerance of various pipes.

Upon the annular sealing member there is a sliding means or lubricant 25 in the form of a silicon oil.

In order to avoid an undesired removal of the said lubricant 25 during a transport of a pipe part 1 with a socket end 2 comprising the annular sealing member 4, with lubricant, there is disposed according to the invention, an annular support or protection member of plastic material in particular polyalkenes, such as polyethylenes or polypropylenes. For reasons to be described hereinafter preference is given to a polypropylene support ring. The said ring may be provided appropriately with a tear-off strip 24 as a weakened wall part, in order to easily remove the protection or support ring 7.

The shape of the protection ring 7 is thus, that the former wholly seals off the internal groove 3.

So as to obtain an easy sealing action, the protection ring 7 is provided with a flexbile deformable first edge part 8, at the side directed toward the free end 7a of the socket, said first edge part 8 being capable of a sufficiently sealing cooperation with the inner wall 9 of the socket end 2.

At the side directed away from the free end 7a of the socket 2 the protection ring is expediently provided with a flexible deformable second edge part 10, likewise capable of efficiently sealing off the internal groove 3, owing to a cooperation with the inner wall 9 of the socket end, thus protecting said groove 3 against any penetration of dust, dirt and the like which would be able to harm the lubricant 25. Furthermore an ultraviolet radiation can no longer inconveniently influence the texture of the rubber material of the annular sealing member.

Furthermore, the use of a protection ring sealing off the internal groove offers the advantage that the sliding means or lubricant can be applied industrially, so that a penetration of a male pipe part at the point of the joint to be formed is facilitated. In practice the lubricant is namely applied at the moment that a male pipe part is going to be slid into the socket end. It will be clear that applying the lubricant industrially is very advantageous.

So as to obtain an even division of the lubricant the bottom part 11 of the protection ring 7 may be appropriately provided with longitudinal grooves 12, as shown in FIG. 2, or with transverse grooves 13 as shown in FIG. 3.

It is to be preferred, however, to give the bottom part 11 of the protection ring a flat shape and to provide the surface of the annular sealing member that has to cooperate with the male pipe part with transverse grooves 14, as shown in FIG. 4. The said grooves cause a receptacle for the lubricant, preferably silicone oil 15, to be formed, capable of lubricating the zone between the annular sealing member and a male pipe part 26.

FIG. 5 shows an embodiment which is to be recommended for automation; the lubricant is applied as a ring 15 of jellied oil or a fat.

In order to obtain an optimum seal between the inside of the socket end and the first edge part 8, the first edge part 8 is connected with the protection ring 7 by means of a pivot 16. The said protection ring further comprises a first cylindrical portion 17 and subsequently a portion comprising a bottom, said bottom running conically toward the direction of a vertical edge part 18 of the protection ring, said edge 18 being part of a second cylindrical portion 19 of the protection ring. As shown in FIG. 6, the second edge part 10 substantially runs perpendicular to the axis of the protection ring. This is a very suitable embodiment for applying a protection ring manually.

FIG. 7 shows that the second edge part 10 runs under an obtuse angle with respect to the protection ring. Both in the embodiment according to FIG. 6 as in the one according to FIG. 7, there is a pivot 20. The embodiment of the protection ring in accordance with FIG. 7 lends itself well for an automation of the application of a support ring.

In some cases it may be preferred to execute the second edge part 10 thus, that its final position, that is after penetration of a male pipe part 26, comes to lie between an end part 21 of the protection ring and the inner wall 22 forming a conical transition between the socket end and the pipe part as shown in FIG. 8.

For that purpose it is to be preferred to provide the second edge part 10 with one or more pivot-shaped connections 20 so as to facilitate an overturning of the second edge part 10.

As is shown the male pipe part 26 has pushed the support or protection ring 7 from below the sealing ring 4. It is noted that the sealing ring is more compressed by the outer side of the male pipe part 26 than by the inner bottom 11 of the support or protection ring 7.

FIG. 9 finally shows a protection or support ring, the end portion of which is provided with an internal chamfer 23, which chamfer runs under an angle with respect to the pipe axis of the pipe part 1, identical to the one of the conical widening 22, representing the joint between the pipe part and the socket end.

So as to realize an effective deformation of the edge parts and in order to obtain an optimum seal, it is to be preferred to manufacture a material for the edge part, being thinner than the further parts of the protection ring and to use other materials for the support ring as a whole having the desired properties to have, for instance, the said edge part overturn when a male pipe part is slid into the socket end, whereby especially for sealing rings polyalkenes such as polypropylenes are used.

The pipe parts as described in the present invention may consist of various materials and, advantageously, of plastic, in particular polyvinylchloride.

It will be obvious that the embodiment of the sealing ring as shown in the drawing, is not limited to the embodiments as shown, as other embodiments of sealing rings can likewise be protected by a protection or support ring in accordance with the invention, thus avoiding damages to lubricant owing to an accumulation of dirt and the like.

It is to be observed that the protection ring 7 is able to compress the annular sealing member 4 in anticipation, thus causing a sliding in of a male pipe part, to be carried out much easier, since the said male pipe part no longer need to be pressed against the rubber body, but first against the protection ring 7 of non-resilient material. Penetration of a male pipe part can further be facilitated by the conically running bottom part 11 of the protection ring 7, causing the annular sealing member to be gradually precompressed further on without being in direct contact with the male pipe part.

Expediently the inner diameter of the protection ring 7 equalizes the inner diameter of the pipe part 1 being connected with the socket end, so as to ensure an even transition between the male pipe part and the pipe part connected with the socket end.

The said protection ring 7 may also be provided with a tear-off strip 24 for an easy removal of the protection ring (see FIG. 10) when said protection ring has to be removed in order to realize the final assembly.

Figure 11:
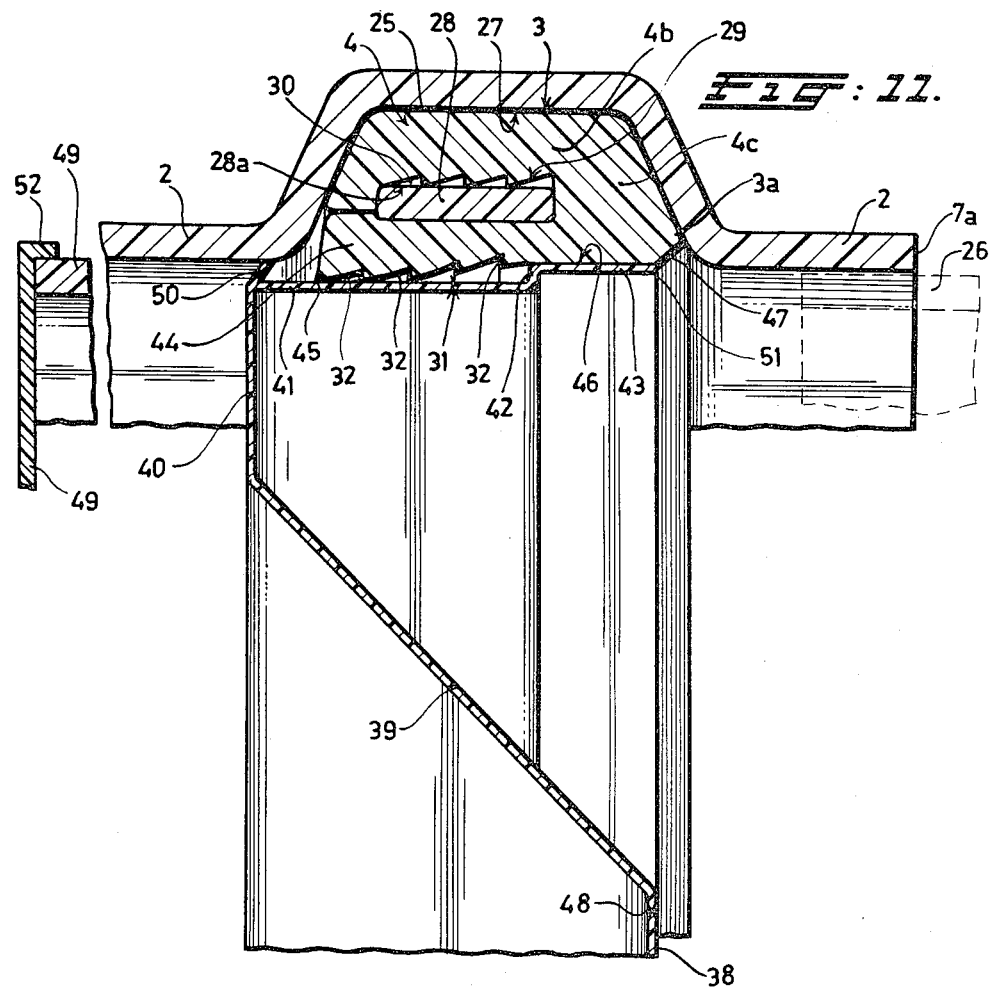
FIG. 11 shows a pipe part in accordance with the invention comprising a protection ring in a wholly different embodiment.
Figure 12:
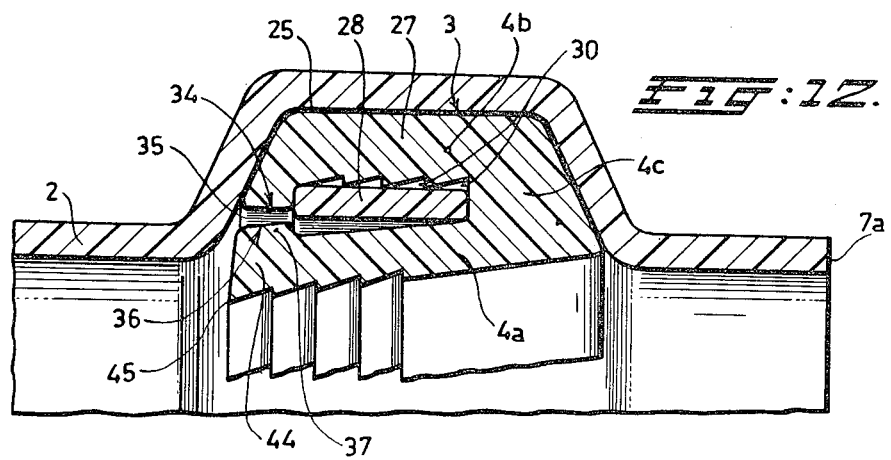
FIG. 12 shows the sealing member of FIG. 11, excluding the protection ring.

FIG. 11 shows a variant of the embodiment of the protection member including a preferred embodiment of the annular sealing member.

In the groove 3 there is received an annular sealing member 4 having a cross sectional U-shape, the open end 5 of which being directed away from the free end 7a of the socket 2.

The annular sealing member comprises an inner leg 4a and an outer leg 4b, said legs 4a and 4b being interconnected through a connecting part 4c.

In between the bottom 26 of the annular groove 3 and the opposite side 27 of the sealing member 4, there is lubricant 25, in the form of a silicone oil.

The outer leg 4b of the annular sealing member 4 is supported by a flexible support ring 28 for instance consisting of polypropylene said ring 28 being flexible in order to be able to properly insert the annular sealing member 4 together with the support ring 28.

So as to obtain a proper seal and in order to absorb any tolerances, the inner surface 29 of the outer leg 4b of the annular sealing member 4 is provided with grooves 30.

It will be obvious that the inner surface 29 of the leg 4b can be flat, that is to say cylindrical when the surface 28a of the lower support ring is provided with grooves, having the same function as the grooves 30 in the surface 29 of the outer leg 4b of the annular sealing member 4.

Grooves 32 being provided in the surface 31 of the inner leg 4a ensure an optimum seal.

As can be seen, the said leg 4a expands in its free position slantingly toward the center of the axis of the socket end 2.

It is likewise shown that in the free position there is also a space 35 between the projection 34 of leg 4b and the outer surface 36 of the projection 27 of the inner leg 4a of the annular sealing member 4.

Due to the use of the projection 37, the surface 36 of which cooperates with the surface 34, both surfaces being located beside the rigid retaining ring 28, an optimum seal is carried out; it is, however, very expedient to apply lubricant 25 in between the bottom 26 of the annular groove 23 and the surface 27 of the leg 4b of the annular sealing member 4, located opposite thereto. During the introduction of the male pipe part, the said lubricant enables the leg 4b to be slightly slid along the inside of bottom wall 26 of the annular groove 23, thus ensuring an optimum seal by a levelling of the compression.

A protection member comprising a first end surface 38, merging in a second and surface 40, through a conical surface 39, ensures a proper protection of the lubricant 25 present upon the surface 31 of the inner leg 4a. A cylindrical surface 41, merging in a second cylindrical surface 43 through an axially extending transition surface 43, adjoins the second end surface 40, protruding beyond the conical surface 39. The outer diameter of the cylinder formed by the surface 43 exceeds the inner diameter of the cylinder formed by the surface 41 of the protection member. The surface 43 cooperates with a wall part 46 of the sealing member 4.

The outer diameter of the cylindrical portion is preferably larger than the smallest inner diameter of the annular sealing member, the said smallest diameter being at the end 45 of the end part 44 of the leg 4a of the annular sealing member.

The above combination of features ensures an optimum seal between the wall 41 and the inner surface 31 of the leg 4a of the annular sealing member.

The end part 44 of leg 4a pressed toward the outside, may tend to press the protection cap toward the direction of the free end 7a of the socket, thus causing the said cap to loose its protecting function.

In order to obviate the abovementioned disadvantage the cylindrically or conically extending surface 43 is provided with blocking means in the form of an outwardly protruding edge 47 cooperating with the wall 3a of the groove 3. It will be clear that in any case the largest outer diameter of the edge 23 exceeds the inner diameter of the socket, as seen from the groove toward the direction of the free end 7a of the socket.

In order to speed up the removal of the protection cap of thinwalled plastic, the first end surface 38 may be provided with a circular weakening of the wall, which can be pressed away by hand so as to be able to get beyond the first end surface 38 and to easily remove the flexible protection cap.

If desired, the said protection cap can still be provided with a free circumferential edge 50 being connected pivotally or deformably with said cap and being capable of sealing off the groove 3 at the side other than the edge 47.

In case the said circumferential edge 50 is not provided, it is to be preferred to seal off the other end of the pipe part 1, by an end cap 49, especially when there is question of the presence of lubricant 28. So as to avoid damages it is then to be preferred to manufacture the material of the end cap in a somewhat greater wall thickness. Such an end cap engages the outer wall of the pipe part 1 by means of a vertical edge.

It goes without saying that instead of using protecting rings and protection caps, both ends of the pipe part 1 with the socket end 2 can also be provided with end caps.

Finally, it should be observed that the first end wall 38 substantially lies in one plane with the end 51 of the circular part 43. The second end surface 40 extends preferably at distance from the inward end of the sealing member, more preferably till the inward end of the groove or beyond the same.

It is an important feature of the present invention that the protection members within the socket can hardly be damaged during transport.

It goes without saying that the conical surface 39 may also be a cylindrical surface.

Also in this case the sealing ring is less compressed by the protection or support ring than by the male pipe part 26 to be connected with the socket.

Figure 13:
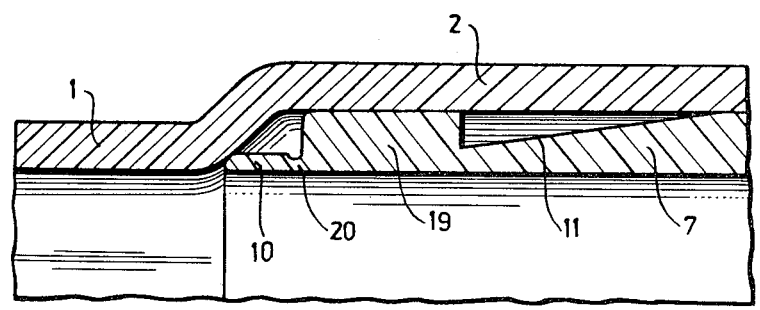
FIG. 13 shows a detail of a pipe part in accordance with the invention after the insertion of a male pipe part, the support ring being modified.

FIG. 13 shows part of a support and protecting ring 7 in its end position after having pushed a male pipe part into the socket.

FIGS. 14a to 14j show a very advantageous embodiment of the method in accordance with the invention for applying an annular sealing member in an annular groove of a socket end, while using a support or protection ring.

A slideable sleeve 132 and a support ring 7 comprising an annular sealing member thereupon in the form of a rubber ring 4, are slid upon a mandrel 126. The support ring 7 is executed as shown in FIG. 1. After having slid the support ring 7 upon the mandrel 126, the annular sealing member 4 and/or the outside of the support or protection ring 7, are provided with a lubricant, for instance a silicone oil. A second lubricant in the form of the ring 15, as shown in FIG. 5, may, however, also be used.

The situation obtained after having slid the sleeve 132 and the support ring 7 upon the mandrel 126 is shown in FIG. 14b.

The mandrel 126 comprises an expandable core 127 which cores are known per se. After having placed the sleeve 132 and the support ring 7 upon the mandrel 126, the expandable core 127 is expanded, so that the situation arises as shown in FIG. 14c. Subsequently two first deformation ring halves 128 are placed upon the mandrel 126, said halves forming a ring having an outer diameter bounded by the outer diameter 128a of the first ring halves being larger than the outer diameter of the circular surface 127a of the expanded core 127.

Subsequently second deformation ring halves 129 are placed upon the first deformation ring halves 128; the second deformation ring halves 129 are also provided with shoulders 129b, which are slid against the shoulders 128b of the first deformation ring halves.

The outer diameter of the second deformation ring halves 129 is bounded by the outer diameter 129a of the second deformation ring halves 129 adjoining to a ring.

For completeness' sake, it is observed that instead of two first deformation ring halves 128 and two second deformation ring halves 129, the same result can, naturally, also be obtained when more than two ring halves are applied, which is especially recommended when deforming plastic pipes 1 having a large diameter.

After having positioned the first deformation ring halves 128 and the second deformation ring halves 129 and having expanded the expandable core 127, a plastic pipe part 1, for instance of polyvinylchloride, is heated up to 160° C. and is slid upon the mandrel 126 so that a second widening 131 and a first widening 130 are obtained owing to the expansion of the core 127. It should be noted that the outer diameter of the mandrel 126 prior to the expansion of the core 127 is substantially equal to the inner diameter of the plastic pipe part 1 to be deformed.

In order to stabilize the second widening 131 and the heated part of pipe 1, members 132 spray cooling liquid upon the second widening 131 which is in contact with the expanded core 127 and on the still heated part of the pipe part 1, which is in contact with mandrel 126.

Subsequently the first deformation ring halves 128 are slid from beneath the second deformation ring halves 129 and removed, as shown in FIG. 14e.

Figure 14F:
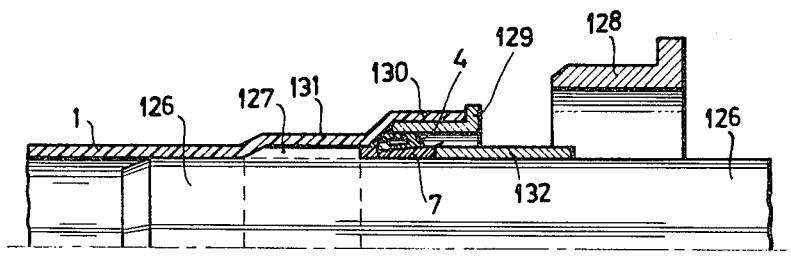
Figure 14G:
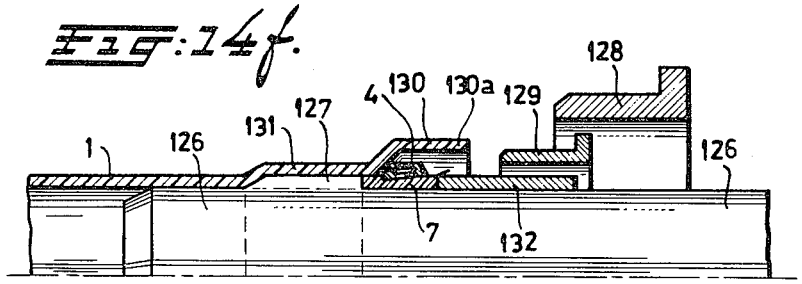

Although the temperature of the first widening 130 is still high, so that the same tends to shrink back to its original size, this is avoided by the second ring deformation halves 129 which are still present. By means of the sleeve 132 the support ring 7 comprising the annular sealing member 4, is subsequently slid into the space 134 bounded by the inside of the second ring deformation halves 129 and the outside of the mandrel 126, as shown in FIG. 14f.

Subsequently the second ring deformation halves 129 are removed so that the second widening 131 will also tend to shrink back into its original shape. This may be improved, if desired, by suction through vacuum; in some cases it may be necessary to press part 130a of the first widening 130 upon the sleeve 132 by the aid of an external deformation means. The outer diameter of sleeve 132 corresponds to the outer diameter 127a of the expanded core 127.

Subsequently the whole assembly is fully cooled so that the situation is obtained as shown in FIG. 14a.

Thereafter the expandable core is retracted until it has a diameter such, that the latter does not exceed the outer diameter of the mandrel 126.

After removal of the sleeve 132, the pipe part is ready for use in a socket connection or joint.

In order to obtain an optimum joint a male pipe part 121 can be slid into the formed socket 2 with the groove 3 and the annular sealing member 4 received therein, supported by the support ring 7.

Figure 14H:
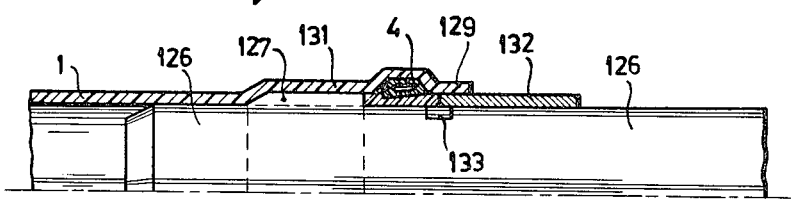
Figure 14I:
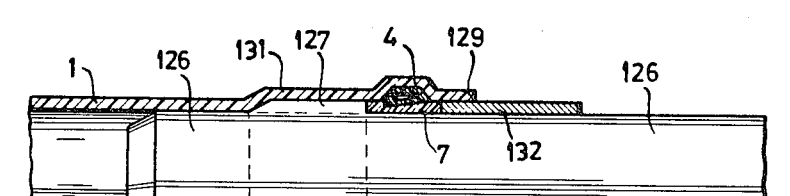
Figure 14J:
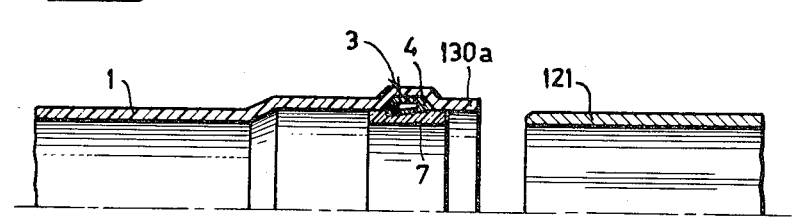

For a good deformation of the part 130a of the first widening 130, causing the said part 130a to fully adjoin the sleeve 132, a vacuum suction device can advantageously be used, like shown in FIG. 14h.

It will be obvious that the method as described with respect to the FIGS. 14a–14j. lends itself more appropriately for a continuous process.

In the embodiment of FIG. 11 it is also possible to weaken or to perforate the second wall 40 of the end cap; this weakening perforation is then e.g. made in the wall 40 immediately beside the cylindrical surface 41. If now a male pipe part 26 penetrates, the cap is pushed to the left of the drawing after having removed the second surface 40 with conical surface 39 and first end surface 38 along said weakening or perforation.

It should be noted that parts 47, 50 and 42 in FIG. 11 act as locking means for the support ring, and the same action can be attributed to the parts 8, 10, upstanding wall 18 and ribs 12, 13 of the support ring as shown in the other figures. The locking means prevent an undesired inward pushing of the support ring not due to the insertion of a male pipe part 26.

What is claimed is:

1. A pipe part having a socket end for receiving a male pipe part, said socket end having an internal groove,
    an annular sealing member disposed in said groove,
    a support ring supporting said annular sealing member,
    said support ring having a first and second deformable sealing edge parts extending therefrom which sealingly engage said pipe part on opposite ends of said internal groove, said support ring compressing said sealing ring less than a male pipe part after its insertion, and a lubricant disposed in the space between overlapping portions of said sealing member and support ring whereby said support ring is removable from below said sealing member upon insertion of said male pipe part.

2. The pipe part of claim 1, wherein the support ring is slideable within the socket end.

3. The pipe part of claim 1, wherein at least one of said first and deformable sealing second edge parts being connected with the support ring is thinner than the further material of the support ring.

4. A pipe part as defined in claim 3, wherein the lubricant is at least present upon a support part of the support ring.

5. A pipe part as defined in claim 3, wherein the lubricant is present upon the side of the annular sealing member being directed toward the free socket end.

6. A pipe part as defined in claim 1, wherein said second edge part of the support ring extends at least slantingly with respect to the axis of the support ring.

7. The pipe part of claim 1, wherein said second edge part of said supporting ring is pivotally connected to said supporting ring.

8. A pipe part as defined in claim 13, wherein second edge part comprises several pivots;

9. The pipe part of claim 1, wherein the side of the support ring being directed toward the sealing member, is provided with grooves.

10. The pipe part of claim 1, wherein the portion of the annular sealing member adjoining the support ring, is provided with transverse grooves.

11. The pipe part of claim 1, wherein the cross section of the sealing member is substantially U-shaped, the open side of which being directed away from the free end of the socket.

12. The pipe part of claim 1, wherein the support ring comprises a base portion conically tapering inwardly of the socket.

13. A pipe part as defined in claim 12, wherein the lowermost point of a tapering base portion of the support ring adjoins a vertical wall.

14. The pipe part of claim 1, wherein the end part directed away from the free end of the socket is chamfered.

15. The pipe part of claim 1, wherein the internal diameter of the support ring substantially corresponds to the internal diameter of the pipe part adjoining the socket end.

16. The pipe part of claim 1, the support ring being provided with a tear-off strip.

17. A pipe part having a socket end for receiving a male pipe part, said socket end having an internal groove,
    an annular sealing member disposed in said groove,
    a support ring supporting said annular sealing member, said support ring having first and second deformable sealing edge parts which sealingly engage said pipe part on opposite ends of said internal groove and a protection member across the pipe openings, said support ring being removable from below said sealing member prior to insertion of said male pipe part.

* * * * *